US008416592B2

(12) United States Patent
Zhang et al.

(10) Patent No.: US 8,416,592 B2
(45) Date of Patent: Apr. 9, 2013

(54) CONTROL METHOD FOR SOFT SWITCH CIRCUIT IN SWITCH POWER SUPPLY

(75) Inventors: Chuntao Zhang, Shenzhen (CN); Xiaofei Zhang, Shenzhen (CN); Xueli Xiao, Shenzhen (CN)

(73) Assignee: Liebert Corporation, Columbus, OH (US)

( * ) Notice: Subject to any disclaimer, the term of this patent is extended or adjusted under 35 U.S.C. 154(b) by 0 days.

(21) Appl. No.: 12/678,030

(22) PCT Filed: Sep. 8, 2008

(86) PCT No.: PCT/CN2008/072291
§ 371 (c)(1),
(2), (4) Date: Sep. 2, 2010

(87) PCT Pub. No.: WO2009/039756
PCT Pub. Date: Apr. 2, 2009

(65) Prior Publication Data
US 2010/0315152 A1 Dec. 16, 2010

(30) Foreign Application Priority Data
Sep. 14, 2007 (CN) .......................... 2007 1 0153963

(51) Int. Cl.
*H02H 7/122* (2006.01)
*H02M 3/335* (2006.01)
(52) U.S. Cl. .................................. 363/56.02; 363/21.02
(58) Field of Classification Search ............... 363/21.02, 363/56.01, 56.02, 95–98, 131, 132
See application file for complete search history.

(56) References Cited

U.S. PATENT DOCUMENTS

| 5,898,583 | A | * | 4/1999 | Delgado et al. | 363/98 |
| 5,949,669 | A | * | 9/1999 | Bruckmann et al. | 363/132 |
| 6,205,040 | B1 | * | 3/2001 | Teichmann | 363/57 |
| 6,278,626 | B1 | * | 8/2001 | Teichmann | 363/135 |
| 6,979,980 | B1 | * | 12/2005 | Hesterman et al. | 323/222 |
| 7,336,512 | B2 | * | 2/2008 | Geissler | 363/89 |
| 7,411,797 | B2 | * | 8/2008 | Norrga et al. | 363/17 |
| 7,778,056 | B2 | * | 8/2010 | Geissler | 363/89 |
| 8,184,458 | B2 | * | 5/2012 | Isurin et al. | 363/56.12 |
| 2011/0278953 | A1 | * | 11/2011 | Zhang et al. | 307/115 |

FOREIGN PATENT DOCUMENTS
CN 2938558 8/2007
* cited by examiner

*Primary Examiner* — Adolf Berhane
(74) *Attorney, Agent, or Firm* — Harness, Dickey & Pierce, P.L.C.

(57) ABSTRACT

The present invention relates to a control method for a soft switch circuit in a switch power supply, which controls first and second main power switch devices to be turned on and turned off constantly to generate an alternating main power filter current, and controls forward and backward auxiliary switch devices to be turned on and turned off to generate an intermittent alternating resonant current across a resonant branch in the same direction as the main power filter current to thereby achieve zero-voltage turn-on of the first and second main power switch devices; and further controls the forward and backward auxiliary switch devices to be turned on and turned off to generate compensation currents across the resonant branch in the opposite direction to the alternating main power filter current in at least a period of time during resting of the resonant current to thereby accomplish a charging and discharging process of resonant capacitors in a dead time. Thus, a freewheeling diode can be turned on normally, so that it is possible to avoid a damage to the devices due to an impact current and a spark voltage resulting at zero crossing of the current in the soft switch circuit.

26 Claims, 5 Drawing Sheets

CONTROL METHOD FOR SOFT SWITCH CIRCUIT IN SWITCH POWER SUPPLY

CROSS-REFERENCE TO RELATED APPLICATIONS

This application is a U.S. National Stage Application of International application No. PCT/CN2008/072291, filed Sep. 8, 2008. This application claims the benefit of Chinese Application No. 200710153963.5, filed Sep. 14, 2007. The disclosures of the above applications are incorporated herein by reference.

FIELD OF THE INVENTION

The present invention relates to a switch power supply, and in particular to a control method for a soft switch circuit in a switch power supply.

BACKGROUND OF THE INVENTION

Switch power supplies are currently in the trend of developing towards high frequency and miniaturization, high power density, high efficiency and low cost. Since semiconductor devices function as hard switches and suffer from a great loss, traditional switch circuits fail to improve their own efficiencies and thus become less competitive in the market due to their bulkiness. In view of limitations of the development in the industry of semiconductor devices, the cost, etc., a soft switch circuit topology has become an option for a majority of switch power supply manufacturers to improve competitiveness of products. There are numerous researches and patents on soft switch circuits, and one of them is a soft switch circuit of Auxiliary Resonant Commutated Pole (ARCP) in the form of "inductor plus switch" in series, which has won the popular favor of those skilled in the art of switch power supplies due to its simple hardware circuit, easiness to control and satisfactory effect. Chinese Utility Model Patent ZL 200620131113.6, for example, discloses an ARCP soft switch circuit, which is an improvement on such a soft switch circuit.

Figure 1:
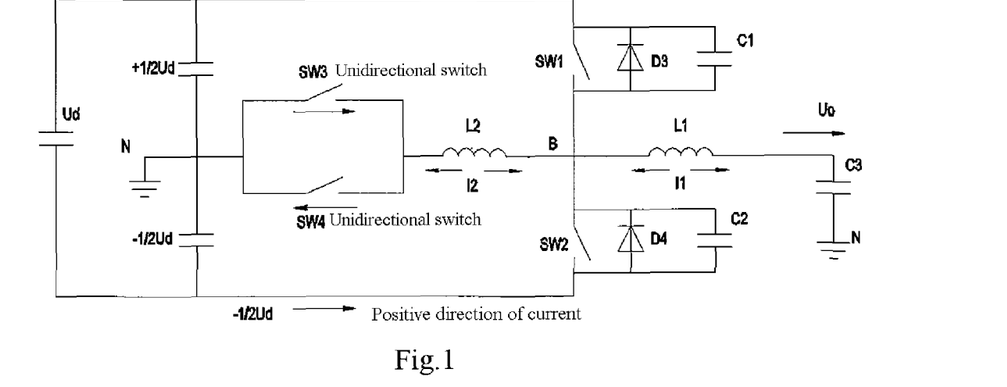
FIG. 1 illustrates a schematic diagram of the operation principle of an ARCP soft switch circuit in the prior art.

The operation principle of a traditional hard switch circuit is as follows: as illustrated in FIG. 1, positive and negative direct current power supplies ±½Ud and main power switch devices SW1 and SW2 constitute a main power half bridge inverter circuit. The main power switch devices SW1 and SW2 are controlled to be turned on and turned off constantly to generate a high frequency pulse voltage of ±½Ud at the point B. A power frequency output voltage required according to the design across a resonant capacitor C3 and a main power filter current I1 across a inductor L1 are generated through the inductor L1 and the resonant capacitor C3 of a main power filter circuit. Here, the main power switch devices SW1 and SW2 belong to traditional hard switches, which suffer from a great loss.

In order to lower the loss of the main power switch devices SW1 and SW2, two unidirectional auxiliary switch devices SW3 and SW4 and a resonant inductor L2 are added in the ARCP soft switch circuit, and also resonant capacitors C1 and C2 with larger capacitances relative to parasitic capacitances of SW1 and SW2 are arranged in parallel across the main power switch devices SW1 and SW2 respectively. The auxiliary switch devices SW3 and SW4 are controlled to be turned on and turned off to generate a resonant current I2 across the resonant inductor L2 in the same direction as the main power filter current I1, and the resonance of the resonant inductor L2 and the resonant capacitor C3 achieves the zero-voltage turn-on of the main power switch devices SW1 and SW2. Also the parallel arrangement of the resonant capacitors C1 and C2 with larger capacitances relative to the parasitic capacitances of the main power switch devices SW1 and SW2 across SW1 and SW2 respectively achieves zero-voltage turn-off of the main power switch devices. Thus, the ARCP soft switch circuit can achieve both zero-voltage turn-on and zero-voltage turn-off of the main power switch devices SW1 and SW2 to thereby significantly lower the loss of the main power devices. Further regarding the newly added auxiliary switch devices SW3 and SW4, no abrupt change of the current will occur due to the presence of the resonant inductor L2 in series therewith to thereby achieve zero-current turn-on, and a reasonable control on the times to turn on and turn off auxiliary switch devices SW3 and SW4 can achieve zero-current turn-off of the auxiliary switch devices SW3 and SW4, so that the newly added auxiliary switch devices SW3 and SW4 can operate in a state of both zero-current turn-on and zero-current turn-off with a very small switching loss.

As can be apparent from the foregoing analysis, the ARCP soft switch circuit achieves both zero-voltage switching of the main power switch devices SW1 and SW2 with a reduced loss and zero-current switching of the auxiliary switch devices SW3 and SW4 with a very small switching loss that can substantially be negligible. Thereby, a significantly improved overall operation efficiency of the circuit, a greatly lowered overall loss and an remarkably reduced volume of the entire equipment are achieved, and hence product competitiveness is improved.

Although the ARCP soft switch circuit has the foregoing advantages of low loss and high efficiency, this circuit topology has been identified in practice with an apparent drawback, i.e., a freewheeling diode D4 can not be normally turned on in the positive half cycle when the main power filter current I1 is small, particularly around a zero crossing point, which may cause the following adverse consequences:

1) A large impact current across the resonant capacitors C1 and C2 may cause shorten lifetime and even failure thereof.
2) A large impact current across the main power switch device SW2 may cause lowered reliability and even failure thereof.
3) A high spike voltage across the main power switch device SW1 may cause breakdown and consequential failure thereof.

All of the foregoing three adverse consequences may directly cause abnormal operation of the circuit and even impossible normal operation of the entire equipment. Similarly, a freewheeling diode D3 being not normally turned on in the negative half cycle may cause the following adverse consequences:

1) A large impact current across the resonant capacitors C1 and C2 may cause shorten lifetime and even failure thereof.
2) A large impact current across the main power switch device SW1 may cause lowered reliability and even failure thereof.
3) A high spike voltage across the main power switch device SW2 may cause breakdown and consequential failure thereof.

SUMMARY OF THE INVENTION

A technical issue to be addressed by the invention is how to overcome the foregoing drawbacks present in the ARCP software switch circuit.

In order to address the foregoing technical issue, the invention provides an improved control method for a soft switch circuit in which further to the control steps of the foregoing ARCP software switch circuit, the forward and backward auxiliary switch devices are controlled to be turned on and turned off to generate compensation currents across the resonant branch in the opposite direction to the alternating main power filter current in at least a period of time during resting of a resonant current to thereby accomplish a charging and discharging process of the resonant capacitors in a dead time and enable the freewheeling diodes to be turned on normally, so that it is possible to avoid a damage to the devices due to an impact current and a spark voltage resulting at zero crossing of a current in the soft switch circuit.

The invention further provides an improved control method for a soft switch circuit in which the switch control of the foregoing ARCP software switch circuit is modified in a way that controlling the backward and forward auxiliary switch devices generating resonant currents respectively in the positive half cycle and negative half cycle to be turned on in the dead time and turned off when the first and second main power switch devices are in the turn-on state, and the forward and backward auxiliary switch devices are further controlled to be turned on and turned off to generate compensation currents across the resonant branch in the opposite direction to the alternating main power filter current in at least a period of time during resting of the resonant current to thereby accomplish a charging and discharging process of the resonant capacitors in the dead time and enable the freewheeling diodes to be turned on normally, so that it is possible to avoid a damage to the devices due to an impact current and a spark voltage resulting at zero crossing of a current in the soft switch circuit Particularly, the main power switch devices and the auxiliary switch devices can be semiconductor devices of IGBT, MOSFET, GTO or SCR.

Advantageous effects of the invention over the ARCP software switch circuit in the prior art are as follows.

A compensation current is generated across the resonant branch in the opposite direction to the main power filter current to increase the charging and discharging currents of the resonant capacitors and expedite commutation. Thereby a charging and discharging process of the resonant capacitors in a dead time is accomplished under the condition that the main power filter current is small, so that the freewheeling diodes can be turned on normally. Accordingly, it is possible to avoid occurrence of an impact current and a spark voltage, protect effectively the switch devices and the resonant capacitors and improve reliability of the operation of circuit and entire equipment.

BRIEF DESCRIPTION OF THE DRAWINGS

FIG. 6A and FIG. 6B to FIG. 17A and FIG. 17B illustrate respectively schematic diagrams of switch logics in the positive half cycle and negative half cycle of a soft switch circuit according to respective embodiments according to the invention in which the starting times in the positive half cycle and negative half cycle are respectively times during the turned-on state of SW1 in the immediately preceding negative half cycle and positive half cycle thereof.

DETAILED DESCRIPTION OF THE INVENTION

The invention will be further explained hereinafter with reference to the drawings and in connection with the embodiments.

Firstly, an analysis of the operation principle, particularly the zero crossing of a main power filter current, of the ARCP soft switch circuit in the prior art will be made before the embodiments are explained.

Figure 2:
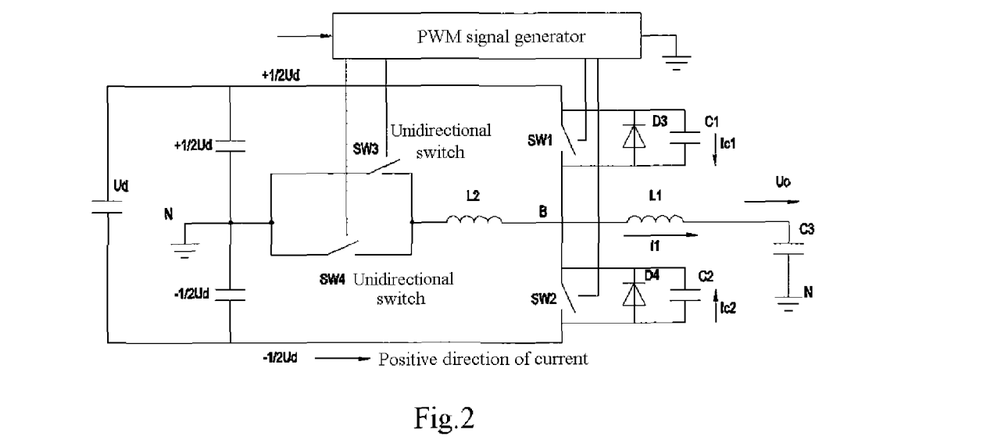
FIG. 2 illustrates a schematic diagram of the operation principle in the positive half cycle of the ARCP soft switch circuit in the prior art.

As shown in FIG. 2, which illustrates a schematic diagram of the operation principle of an embodiment of the ARCP soft switch circuit in the prior art, the circuit includes a main power half bridge inverter circuit composed of positive and negative direct current power supplies and main power switch devices SW1 and SW2, a main power filter circuit which generates a power frequency output voltage Uo and a main power filter current I1 and which further includes two unidirectional switch devices SW3 and SW4 and a resonant inductor L2 for reducing the loss of SW1 and SW2, and a PWM signal generator for controlling the main power switch devices SW1 and SW2 and the unidirectional switch devices SW3 and SW4 to be turned on and off.

The PWM signal generator for controlling the main power switch devices SW1 and SW2 and the unidirectional switch devices SW3 and SW4 to be turned on and off can be replaced with a PFM signal generator, a PWM-PFM hybrid signal generator, other type of square wave signal generator or CPU, etc.

Figure 5:
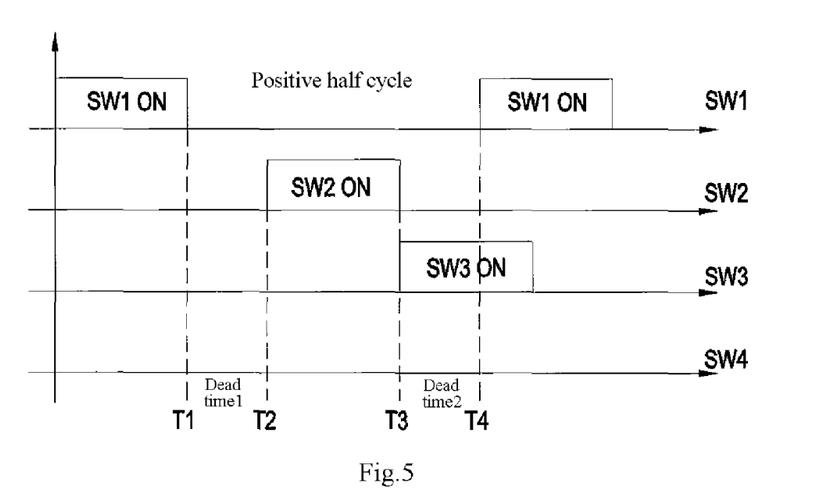
FIG. 5 illustrates a schematic diagram of a switch logic in the positive half cycle of the ARCP soft switch circuit in the prior art in which the starting time is a time during the turned-on state of SW1 in the negative half cycle immediately preceding the positive half cycle.

Taking the positive half cycle as an example in which an output filter current is in the positive direction, FIG. 5 illustrates the turning-on logic of the respective switch devices, and FIG. 2 illustrates a schematic diagram of its operation principle. As can be apparent from the operation principle of the ARCP soft switch circuit, the auxiliary switch device SW3 must be turned on before the main power switch device SW1 is turned on and after the main power switch device SW2 is turned off, i.e., turned on from the time T3 and turned off after the time T4, in order to achieve zero-voltage turn-on of the main power switch device SW1, so that the auxiliary switch device SW4 does not work and remain in the turn-off state in the positive half cycle.

The operation of the circuit will be normal when the main power filter current I1 is large but be abnormal when the main power filter current I1 is small, particularly around a zero crossing point, detailed descriptions of which are as follows:

Before the time T1, the main power switch device SW1 is in the turn-on state, and other switches are in the turn-off state. At this time, the main power filter current I1 flows in the direction of $+\frac{1}{2}Ud \rightarrow SW1 \rightarrow L1 \rightarrow C3 \rightarrow N \rightarrow +\frac{1}{2}Ud$. At the time T1, the main power switch device SW1 is turned off, and the current passing through the main power switch device SW1 is transferred to the resonant capacitor C1 in parallel therewith, that is, the resonant capacitor C1 starts to be charged and the resonant capacitor C2 starts to be discharged. When the main power filter current I1 is large, a voltage across the resonant capacitor C1 will be boosted up to Ud at the time T2, i.e., before the main power switch device SW2 is turned on, and correspondingly the resonant capacitor C2 will be discharged to zero, during the process the relationship Ic1+Ic2=I1 holding true. Subsequently, the freewheeling diode D4 is turned on, and the current flows in the direction of −½Ud→D4→L1→C3→N→−½Ud. When the main power switch device SW2 is turned on at the time T2, the main power switch device SW2 can be zero-voltage turned on due to the turn-on of the freewheeling diode D4. When the main power filter current I1 approaches a zero crossing point, the foregoing commutation process of charging and discharging the capacitors will be different. The relationship Ic1+Ic2=I1 holds true during charging and discharging of the resonant capacitors C1 and C2. When the main power filter current I1 is small, particularly around a zero crossing point, the currents Ic1 and Ic2 charging and discharging the capacitors are also small, the additional resonant capacitors C1 and C2 are at least ranging from tens to hundreds of nanofarads, the dead time typically is ranging from 1 to 3 nanoseconds, and the relationship I=C×U/T, i.e., U=I×T/C, holds true for charging and discharging of the capacitors. When the currents Ic1 and Ic2 charging and discharging the capacitors are small, the voltage across the capacitors can not be boosted up to Ud in the dead time Td. Under this condition, the resonant capacitor C1 is charged starting from the time T1 till the time T2 at which the voltage across the resonant capacitor C1 is Uc, here Uc<Ud, and at this time the voltage across the resonant capacitor C2 is (Ud−Uc), here (Ud−Uc)>0. Due to the presence of the voltage (Ud−Uc) across the resonant capacitor C2, the freewheeling diode D4 can not be turned on normally, and after the main power switch device SW2 is turned on at the time T2, the voltage (Ud−Uc) across the resonant capacitor C2 is shorted instantaneously by the main power switch device SW2. As experimentally known, a large instantaneous current occurring in the loop of the main power switch device SW2 and the resonant capacitor C2 may theoretically be infinite and typically range from tens to hundreds of amperes due to the presence of some elements of a parasitic inductor, etc. This impact current may cause a considerable harm to the switch device SW2, and it is highly possible to damage the main power switch device SW2 after being subjected to numerous impacts for a long period of time. As for the resonant capacitor C1, after the main power switch device SW2 is turned on at the time T2, the input voltage Ud is connected directly in parallel with the resonant capacitor C1. Due to both the small capacitance of the resonant capacitor C1 relative to the direct power supply Ud and the direct connection therebetween without any current limiter, the voltage across the resonant capacitor C1 will be boosted instantaneously from Uc to Ud to generate a large impact current which may damage greatly the resonant capacitor C1. The resonant capacitor C1 being subjected to numerous impact currents for a long period of time will suffer from shortened lifetime and even failure. Moreover, a parasitic inductor L ranging from tens to hundreds of nanohenries typically exists in a practical line due to the large variation rate of the given current charging the resonant capacitor C1. Due to the large current variation rate dI/dt, it is highly possible for a very high spike voltage Uspike=L×dI/dt occurring across the main power switch device SW1 to exceed the maximum voltage tolerable to the main power switch device SW1, thereby the main power switch device SW1 is caused to be damaged.

As can be apparent from the foregoing analysis of the problem, a fundamental reason of the drawback present in the circuit lies in that the charging and discharging process of the resonant capacitors C1 and C2 can not be accomplished in a dead time.

The invention proposes the following embodiments in view of the foregoing analysis:

The First Embodiment

Figure 3:
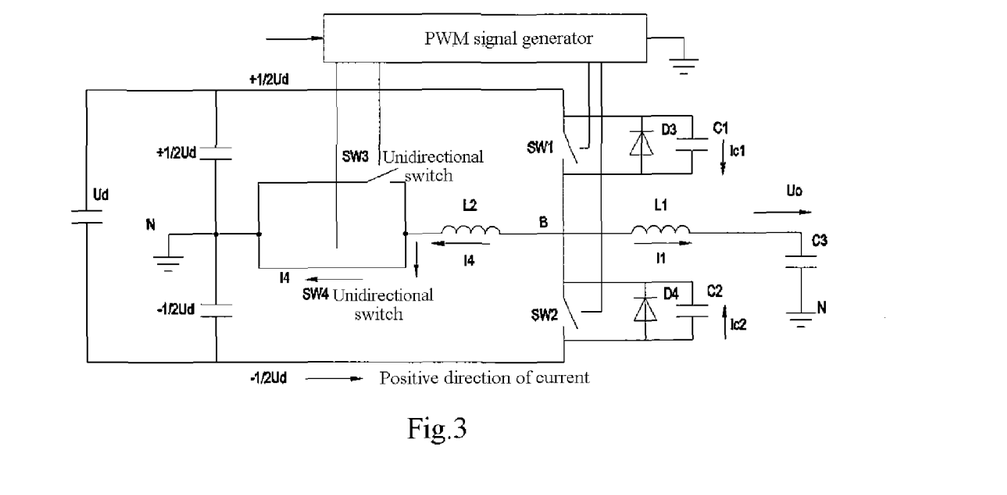
FIG. 3 illustrates a schematic diagram of the operation principle at the time when SW4 is turned on in the positive half cycle in a soft switch circuit according to an embodiment of the invention.
Figure 6A:
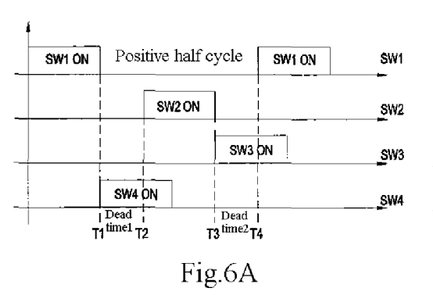

As illustrated in FIG. 6A, a modified control process in the positive half cycle is as follows: the PWM signal generator controls the forward auxiliary switch device SW4 which would otherwise doe not work to also work so that SW4 is turned on at the time T1 when SW1 is turned off, and turned off after the time T2 when SW2 is turned on. FIG. 3 illustrates a schematic diagram of the operation principle when SW4 is turned on. When the main power filter current I1 is small, particularly around a zero crossing point, the resonant capacitor C1 starts to be charged and the resonant capacitor C2 starts to be discharged at the time T1. Due to the forward auxiliary switch device SW4 being turned on and in the present embodiment only a current in the negative direction passing through the forward auxiliary switch device SW4, a compensation current I4 is generated across a resonant current branch in the opposite direction to the main power filter current I1. At this time, the relationship Ic1+Ic2=I1+I4 holds true. Although the main power filter current I1 is small, the currents Ic1 and Ic2 charging and discharging the capacitors will be increased significantly due to the additional compensation current I4, so that in the same dead time a charging and discharging process of the capacitors can be accomplished, and the freewheeling diode D4 can also be turned on normally. After the second main power switch device SW2 is turned on at the time T2, the problem of an impact current, etc., which would otherwise occur can be eliminated due to the freewheeling diode D4 being turned on, thereby the reliability of the devices is improved and hence the reliabilities of the circuit and entire equipment are improved greatly.

Figure 4:
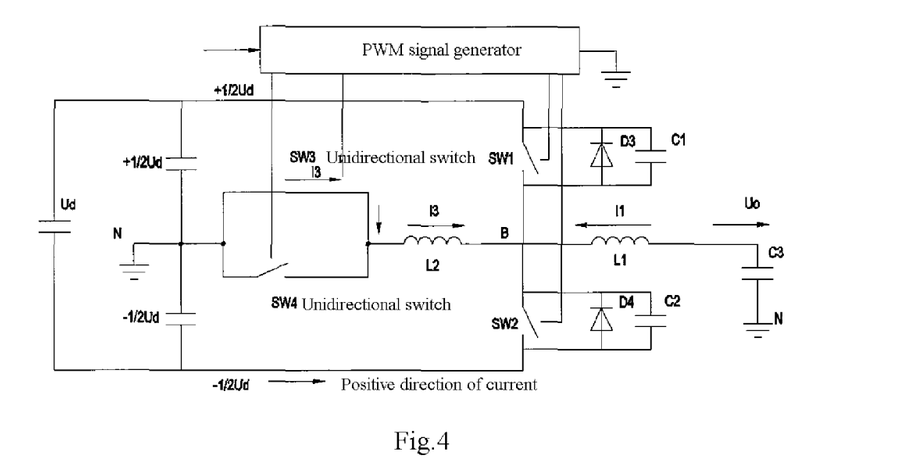
FIG. 4 illustrates a schematic diagram of the operation principle at the time when SW3 is turned on in the negative half cycle in a soft switch circuit according to an embodiment of the invention.
Figure 6B:
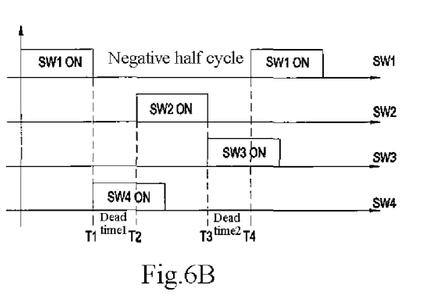

As illustrated in FIG. 6B, a modified control process in the negative half cycle is the same as that in the positive half cycle. FIG. 4 illustrates a schematic diagram of the operation principle when SW3 is turned on, and at this time, a compensation current I3 is generated across the resonant current branch in the opposite direction to the main power filter current I1. Similarly to the positive half cycle, the currents Ic1 and Ic2 charging and discharging the capacitors will be increased significantly due to the compensation current I3, so that in the same dead time a charging and discharging process of the capacitors can be accomplished, and the freewheeling diode D3 can also be turned on normally, thereby the problem of an impact current, etc., which would otherwise occur can be eliminated.

The invention can also address the problem present in the prior art in the following embodiments.

The Second Embodiment

Figure 7A:
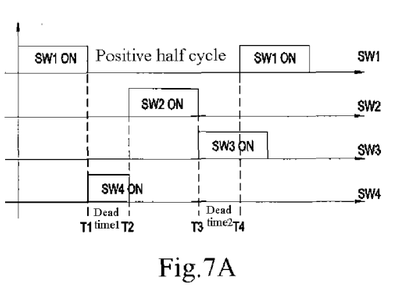
Figure 7B:
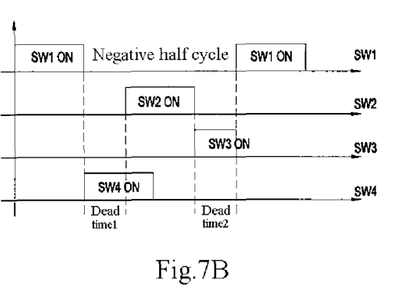

A timing control on the switch devices is performed as in the schematic diagrams of switch logics illustrated in FIG. 7A and FIG. 7B. Specifically, further to the timing control steps of the existing ARCP soft switch circuit: in the positive half cycle, SW4 is turned on at the time T1 when SW1 is turned off, and turned off at the time T2 when SW2 is turned on, i.e., in the turn-on state in the first dead time [T1~T2]; and in the negative half cycle, SW3 is turned on at the time T3 when SW2 is turned off, and turned off at the time T4 when SW1 is turned on, i.e., in the turn-on state in the second dead time [T3~T4]. Similarly to the first embodiment, a charging and discharging process of the resonant capacitors C1 and C2 can be accomplished respectively in the first and second dead time.

The Third Embodiment

Figure 8A:
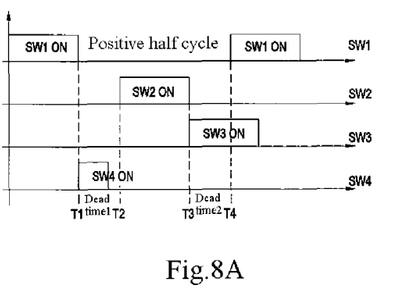
Figure 8B:
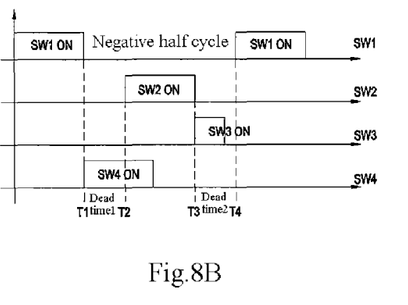

A timing control on the switch devices is performed as in the schematic diagrams of switch logics illustrated in FIG. 8A and FIG. 8B. Further to the timing control steps of the existing ARCP soft switch circuit: in the positive half cycle, SW4 is turned on at the time T1 when SW1 is turned off, and turned off before the time T2 when SW2 is turned on; and in the negative half cycle, SW3 is turned on at the time T3 when SW2 is turned off, and turned off before the time T4 when SW1 is turned on. Similarly to the first embodiment, a charging and discharging process of the resonant capacitors C1 and C2 can be accomplished respectively in the first and second dead time.

The Fourth Embodiment

Figure 9A:
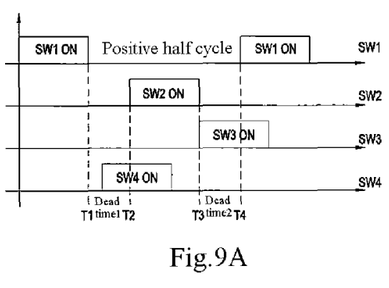
Figure 9B:
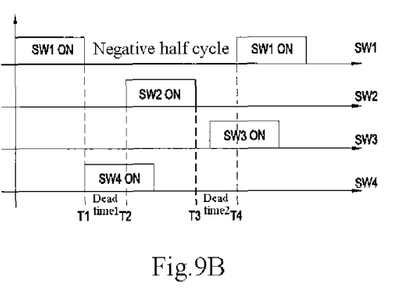

A timing control on the switch devices is performed as in the schematic diagrams of switch logics illustrated in FIG. 9A and FIG. 9B. Further to the timing control steps of the existing ARCP soft switch circuit: in the positive half cycle, SW4 is turned on after the time T1 when SW1 is turned off, i.e., in the first dead time [T1~T2], and turned off after the time T2 when SW2 is turned on; and in the negative half cycle, SW3 is turned on after the time T3 when SW2 is turned off, i.e., in the second dead time [T3~T4], and turned off after the time T4 when SW1 is turned on. Similarly to the first embodiment, a charging and discharging process of the resonant capacitors C1 and C2 can be accomplished respectively in the first and second dead time.

The Fifth Embodiment

Figure 10A:
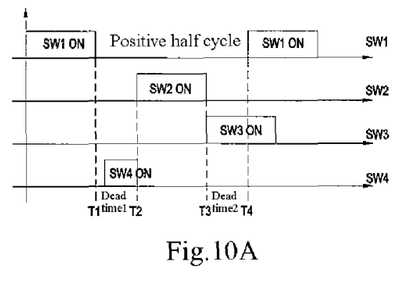
Figure 10B:
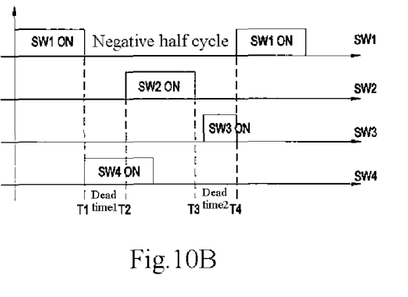

A timing control on the switch devices is performed as in the schematic diagrams of switch logics illustrated in FIG. 10A and FIG. 10B. Further to the timing control steps of the existing ARCP soft switch circuit: in the positive half cycle, SW4 is turned on after the time T1 when SW1 is turned off, i.e., in the first dead time [T1~T2], and turned off at the time T2 when SW2 is turned on; and in the negative half cycle, SW3 is turned on after the time T3 when SW2 is turned off, i.e., in the second dead time [T3~T4], and turned off at the time T4 when SW1 is turned on. Similarly to the first embodiment, a charging and discharging process of the resonant capacitors C1 and C2 can be accomplished respectively in the first and second dead time.

The Sixth Embodiment

Figure 11A:
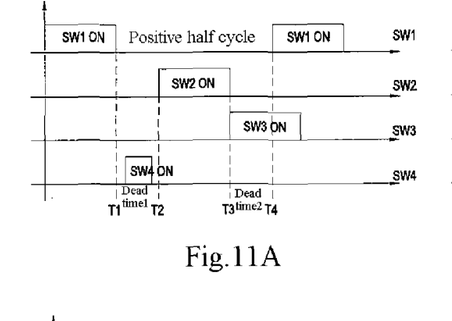
Figure 11B:
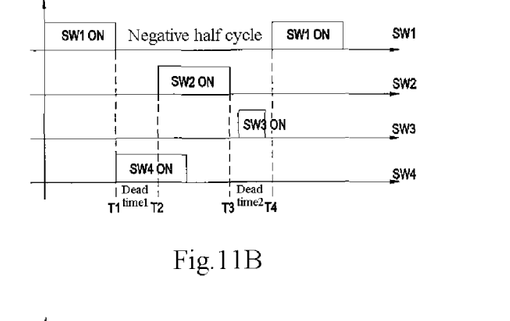

A timing control on the switch devices is performed as in the schematic diagrams of switch logics illustrated in FIG. 11A and FIG. 11B. Further to the timing control steps of the existing ARCP soft switch circuit: in the positive half cycle, SW4 is turned on after the time T1 when SW1 is turned off, i.e., in the first dead time [T1~T2], and turned off before the time T2 when SW2 is turned on; and in the negative half cycle, SW3 is turned on after the time T3 when SW2 is turned off, i.e., in the second dead time [T3~T4], and turned off before the time T4 when SW1 is turned on. Similarly to the first embodiment, a charging and discharging process of the resonant capacitors C1 and C2 can be accomplished respectively in the first and second dead time.

The Seventh Embodiment

Figure 12A:
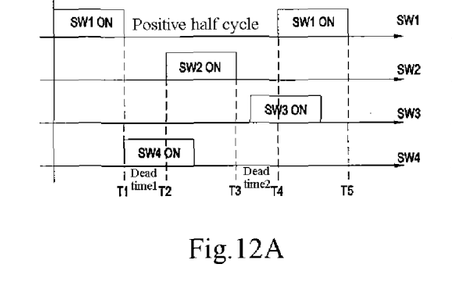
Figure 12B:
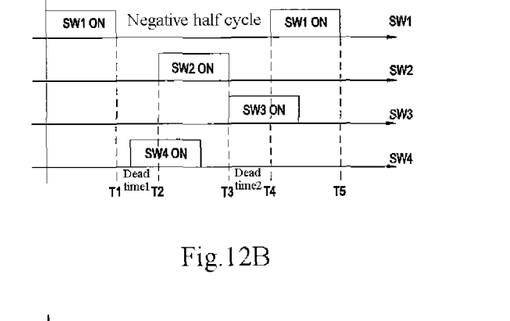

A timing control on the switch devices is performed as in the schematic diagrams of switch logics illustrated in FIG. 12A and FIG. 12B. In the positive half cycle, SW3 of the existing ARCP soft switch circuit is turned on after the time T3 when SW2 is turned off, i.e., in the second dead time [T3~T4], and turned off after the time T4 when SW1 is turned on and before the time T5 when SW1 is turned off, and SW4 is turned on at the time T1 when SW1 is turned on, and turned off after the time T2 when SW2 is turned on and before the time T3 when SW2 is turned off; and in the negative half cycle, SW4 of the existing ARCP soft switch circuit is turned on after the time T1 when SW1 is turned off, i.e., in the first dead time [T1~T2], and turned off after the time T2 when SW2 is turned on and before the time T3 when SW2 is turned off, and SW3 is turned on at the time T3 when SW2 is turned off, and turned off after the time T4 when SW1 is turned on and before the time T5 when SW1 is turned off. Similarly to the first embodiment, a charging and discharging process of the resonant capacitors C1 and C2 can be accomplished respectively in the first and second dead time.

The Eighth Embodiment

Figure 13A:
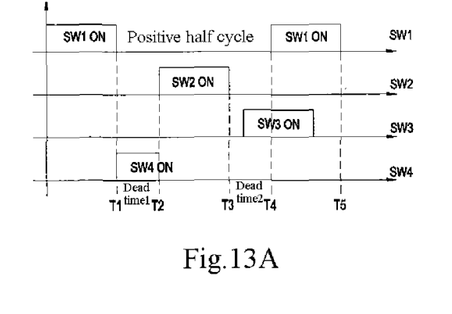
Figure 13B:
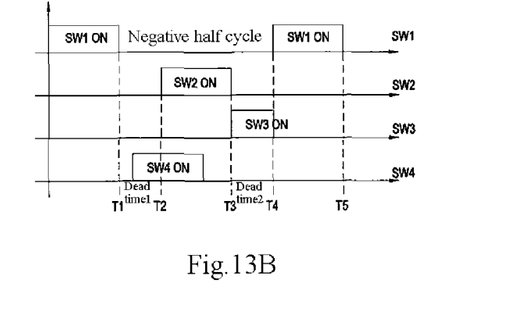

A timing control on the switch devices is performed as in the schematic diagrams of switch logics illustrated in FIG. 13A and FIG. 13B. In the positive half cycle, SW3 of the existing ARCP soft switch circuit is turned on after the time T3 when SW2 is turned off, i.e., in the second dead time [T3~T4], and turned off after the time T4 when SW1 is turned on and before the time T5 when SW1 is turned off, and SW4 is turned on at the time T1 when SW1 is turned off, and turned off at the time T2 when SW2 is turned on, i.e., SW4 is in the turn-on state in the first dead time [T1~T2]; and in the negative half cycle, SW4 of the existing ARCP soft switch circuit is turned on after the time T1 when SW1 is turned off, i.e., in the first dead time [T1~T2], and turned off after the time T2 when SW2 is turned on and before the time T3 when SW2 is turned off, and SW3 is turned on at the time T3 when SW2 is turned off, and turned off at the time T4 when SW1 is turned on, i.e., SW3 is in the turn-on state in the second dead time [T3~T4]. Similarly to the first embodiment, a charging and discharging process of the resonant capacitors C1 and C2 can be accomplished respectively in the first and second dead time.

The Ninth Embodiment

Figure 14A:
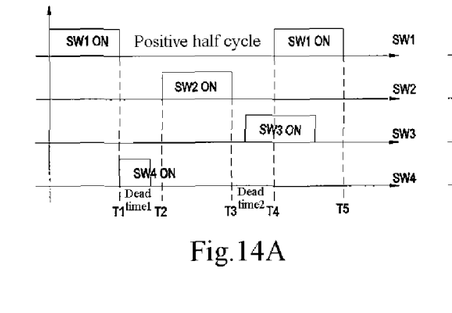
Figure 14B:
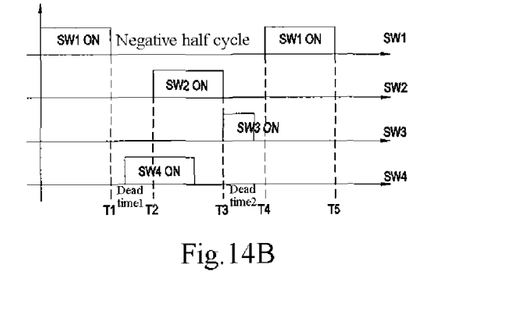

A timing control on the switch devices is performed as in the schematic diagrams of switch logics illustrated in FIG. 14A and FIG. 14B. In the positive half cycle, SW3 of the existing ARCP soft switch circuit is turned on after the time T3 when SW2 is turned off, i.e., in the second dead time [T3~T4], and turned off after the time T4 when SW1 is turned on and before the time T5 when SW1 is turned off, and SW4 is turned on at the time T1 when SW1 is turned off, and turned off before the time T2 when SW2 is turned on; and in the negative half cycle, SW4 of the existing ARCP soft switch circuit is turned on after the time T1 when SW1 is turned off, i.e., in the first dead time [T1~T2], and turned off after the time T2 when SW2 is turned on and before the time T3 when SW2 is turned off, and SW3 is turned on at the time T3 when SW2 is turned off, and turned off before the time T4 when SW1 is turned on. Similarly to the first embodiment, a charging and discharging process of the resonant capacitors C1 and C2 can be accomplished respectively in the first and second dead time.

The Tenth Embodiment

Figure 15A:
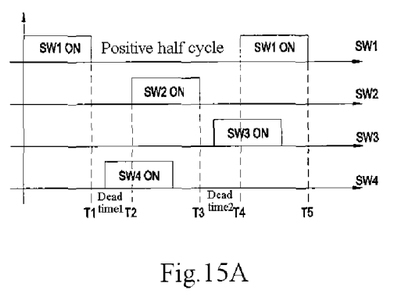
Figure 15B:
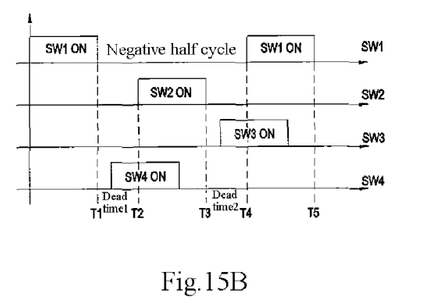

A timing control on the switch devices is performed as in the schematic diagrams of switch logics illustrated in FIG. 15A and FIG. 15B. In the positive half cycle, SW3 of the existing ARCP soft switch circuit is turned on after the time T3 when SW2 is turned off, i.e., in the second dead time [T3~T4], and turned off after the time T4 when SW1 is turned on and before the time T5 when SW1 is turned off, and SW4 is turned on after the time T1 when SW1 is turned off, i.e., in the first dead time [T1~T2], and turned off after the time T2 when SW2 is turned on and before the time T3 when SW2 is turned off; and in the negative half cycle, SW4 of the existing ARCP soft switch circuit is turned on after the time T1 when SW1 is turned off, i.e., in the first dead time [T1~T2], and turned off after the time T2 when SW2 is turned on and before the time T3 when SW2 is turned off, and SW3 is turned on after the time T3 when SW2 is turned off, i.e., in the second dead time [T3~T4], and turned off after the time T4 when SW1 is turned on and before the time T5 when SW1 is turned off. Similarly to the first embodiment, a charging and discharging process of the resonant capacitors C1 and C2 can be accomplished respectively in the first and second dead time.

The Eleventh Embodiment

Figure 16A:
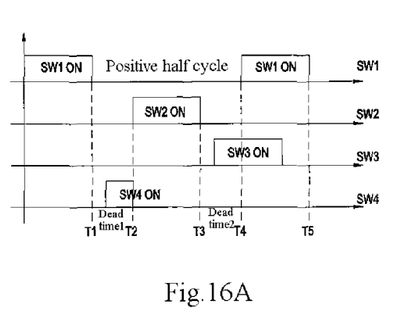
Figure 16B:
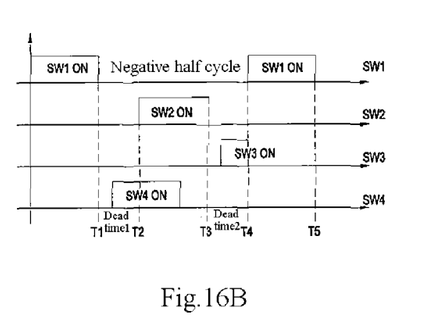

A timing control on the switch devices is performed as in the schematic diagrams of switch logics illustrated in FIG. 16A and FIG. 16B. In the positive half cycle, SW3 of the existing ARCP soft switch circuit is turned on after the time T3 when SW2 is turned off, i.e., in the second dead time [T3~T4], and turned off after the time T4 when SW1 is turned on and before the time T5 when SW1 is turned off, and SW4 is turned on after the time T1 when SW1 is turned off, i.e., in the first dead time [T1~T2], and turned off at the time T2 when SW2 is turned on; and in the negative half cycle, SW4 of the existing ARCP soft switch circuit is turned on after the time T1 when SW1 is turned off, i.e., in the first dead time [T1~T2], and turned off after the time T2 when SW2 is turned on and before the time T3 when SW2 is turned off, and SW3 is turned on after the time T3 when SW2 is turned off, i.e., in the second dead time [T3~T4], and turned off at the time T4 when SW1 is turned on. Similarly to the first embodiment, a charging and discharging process of the resonant capacitors C1 and C2 can be accomplished respectively in the first and second dead time.

The Twelfth Embodiment

Figure 17A:
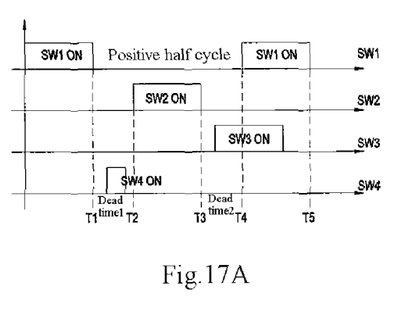
Figure 17B:
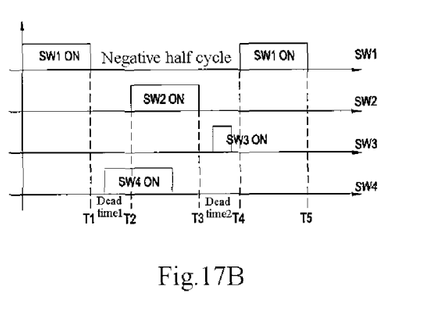

A timing control on the switch devices is performed as in the schematic diagrams of switch logics illustrated in FIG. 17A and FIG. 17B. In the positive half cycle, SW3 of the existing ARCP soft switch circuit is turned on after the time T3 when SW2 is turned off, i.e., in the second dead time [T3~T4], and turned off after the time T4 when SW1 is turned on and before the time T5 when SW1 is turned off, and SW4 is turned on in the first dead time [T1~T2], and turned off before the time T2 when SW2 is turned on; and in the negative half cycle, SW4 of the existing ARCP soft switch circuit is turned on after the time T1 when SW1 is turned off, i.e., in the first dead time [T1~T2], and turned off after the time T2 when SW2 is turned on and before the time T3 when SW2 is turned off, and SW3 is turned on in the second dead time [T3~T4], and turned off before the time T4 when SW1 is turned on. Similarly to the first embodiment, a charging and discharging process of the resonant capacitors C1 and C2 can be accomplished respectively in the first and second dead time.

In the context of the invention, the two unidirectional auxiliary switch devices are defined respectively as forward and backward auxiliary switch devices to distinguish between their uni-directivity of conducting a current in the circuit but not to represent any actual current direction.

The foregoing disclosure presents further detailed descriptions of the invention in connection with the preferred embodiments thereof but shall not be intended to limit the scope of the invention. Various modifications and replacement that can be made by those ordinarily skilled in the art without departing from the spirit of the invention shall be regarded as falling within the scope of the invention.

What is claimed is:

1. A control method for a soft switch circuit in a switch power supply, controlling first and second main power switch devices to be turned on and turned off constantly to generate an alternating main power filter current; and controlling forward and backward auxiliary switch devices to be turned on and turned off to generate an intermittent alternating resonant current across a resonant branch in the same direction as the alternating main power filter current to thereby achieve zero-voltage turn-on of the first and second main power switch devices, wherein:

the control method further controls the forward and backward auxiliary switch devices to be turned on and turned off to generate compensation currents across the resonant branch in the opposite direction to the alternating main power filter current in at least a period of time during resting of the resonant current to thereby accomplish a charging and discharging process of resonant capacitors in a dead time.

2. The control method for a soft switch circuit in a switch power supply according to claim 1, wherein said generating the compensation currents across the resonant branch in the opposite direction to the main power filter current comprises:

in the positive half cycle, that is, when the main power filter current is in the positive direction, controlling the forward auxiliary switch device to be turned on between the time when the first main power switch device is turned off and the time when the second main power switch device is turned on, that is in a first dead time, and to be turned off before the second main power switch device is turned off to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the backward auxiliary switch device to be turned on between the time when the second main power switch device is turned off and the time when the first main power switch device is turned on, that is in a second dead time, and to be turned off before the first main power switch device is turned off to generate the compensation current across the resonant branch in the opposite direction to the main power filter current to thereby accomplish the charging and discharging process of the resonant capacitors in the second dead time.

3. The control method for a soft switch circuit in a switch power supply according to claim 2, wherein said generating the compensation currents across the resonant branch in the opposite direction to the main power filter current comprises:

in the positive half cycle, that is, when the main power filter current is in the positive direction, controlling the forward auxiliary switch device to be turned on at the time when the first main power switch device is turned off, and to be turned off at the time when the second main power switch device is turned on to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the backward auxiliary switch device to be turned on at the time when the second main power switch device is turned off, and to be turned off at the time when the first main power switch device is turned on to generate the compensation current across the resonant branch in the opposite direction to the main power filter current to thereby accomplish the charging and discharging process of the resonant capacitors in the second dead time.

4. The control method for a soft switch circuit in a switch power supply according to claim 2, wherein said generating the compensation currents across the resonant branch in the opposite direction to the main power filter current comprises:

in the positive half cycle, that is, when the main power filter current is in the positive direction, controlling the forward auxiliary switch device to be turned on at the time when the first main power switch device is turned off, and to be turned off before the time when the second main power switch device is turned on to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the backward auxiliary switch device to be turned on at the time when the second main power switch device is turned off, and to be turned off before the time when the first main power switch device is turned on to generate the compensation current across the resonant branch in the opposite direction to the main power filter current to thereby accomplish the charging and discharging process of the resonant capacitors in the second dead time.

5. The control method for a soft switch circuit in a switch power supply according to claim 2, wherein said generating the compensation currents across the resonant branch in the opposite direction to the main power filter current comprises:

in the positive half cycle, that is, when the main power filter current is in the positive direction, controlling the forward auxiliary switch device to be turned on after the time when the first main power switch device is turned off and before the time when the second main power switch device is turned on, and to be turned off after the time when the second main power switch device is turned on and before the time when the second main power switch device is turned off to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the backward auxiliary switch device to be turned on after the time when the second main power switch device is turned off and before the time when the first main power switch device is turned on, and to be turned off after the time when the first main power switch device is turned on and before the time when the first main power switch device is turned off to generate the compensation current across the resonant branch in the opposite direction to the main power filter current to thereby accomplish the charging and discharging process of the resonant capacitors in the second dead time.

6. The control method for a soft switch circuit in a switch power supply according to claim 2, wherein said generating the compensation currents across the resonant branch in the opposite direction to the main power filter current comprises:

in the positive half cycle, that is, when the main power filter current is in the positive direction, controlling the forward auxiliary switch device to be turned on after the time after the first main power switch device is turned off and before the time when the second main power switch device is turned on, and to be turned off at the time when the second main power switch device is turned on to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the backward auxiliary switch device to be turned on after the time when the second main power switch device is turned off and before the time when the first main power switch device is turned on, and to be turned off at the time when the first main power switch device is turned on to generate the compensation current across the resonant branch in the opposite direction to the main power filter current to thereby accomplish the charging and discharging process of the resonant capacitors in the second dead time.

7. The control method for a soft switch circuit in a switch power supply according to claim 2, wherein said generating the compensation currents across the resonant branch in the opposite direction to the main power filter current comprises:

in the positive half cycle, that is, when the main power filter current is in the positive direction, controlling the forward auxiliary switch device to be turned on after the time when the first main power switch device is turned off, and to be turned off before the time when the second main power switch device is turned on to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the backward auxiliary switch device to be turned on after the time when the second main power switch device is turned off, and to be turned off before the time when the first main power switch device is turned on to generate the compensation current across the resonant branch in the opposite direction to the main power filter current to thereby accomplish the charging and discharging process of the resonant capacitors in the second dead time.

8. The control method for a soft switch circuit in a switch power supply according to claim 1, wherein said generating the compensation currents across the resonant branch in the opposite direction to the main power filter current comprises:

in the positive half cycle, that is, when the main power filter current is in the positive direction, controlling the backward auxiliary switch device of an existing ARCP soft switch circuit to be turned on after the time when the second main power switch device is turned off and before the time when the first main power switch device is turned on, and to be turned off after the time when the first main power switch device is turned on and before the time when the first main power switch device is turned off, and controlling the forward auxiliary switch device to be turned on between the time when the first main power switch device is turned off and the time when the second main power switch device is turned on, that is in a first dead time, and to be turned off before the time when the second main power switch device is turned off to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the forward auxiliary switch device of the existing ARCP soft switch circuit to be turned on after the time when the first main power switch device is turned off and before the time when the second main power switch device is turned on, and to be turned off after the time when the second main power switch device is turned on and before the time when the second main power switch device is turned off, and controlling the backward auxiliary switch device to be turned on between the time when the second main power switch device is turned off and the time when the first main power switch device is turned on, that is in a second dead time, and to be turned off before the time when the first main power switch device is turned off to generate the compensation current across the resonant branch in the opposite direction to the main power filter current to thereby accomplish the charging and discharging process of the resonant capacitors in the second dead time.

9. The control method for a soft switch circuit in a switch power supply according to claim 8, wherein said generating the compensation currents across the resonant branch in the opposite direction to the main power filter current comprises:

in the positive half cycle, that is, when the main power filter current is in the positive direction, controlling the backward auxiliary switch device of the existing ARCP soft switch circuit to be turned on after the time when the second main power switch device is turned off and before the time when the first main power switch device is turned on, and to be turned off after the time when the first main power switch device is turned on and before the time when the first main power switch device is turned off, and controlling the forward auxiliary switch device to be turned on at the time when the first main power switch device is turned off, and to be turned off at the time when the second main power switch device is turned on to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the forward auxiliary switch device of the existing ARCP soft switch circuit to be turned on after the time when the first main power switch device is turned off and before the time when the second main power switch device is turned on, and to be turned off after the time when the second main power switch device is turned on and before the time when the second main power switch device is turned off, and controlling the backward auxiliary switch device to be turned on at the time when the second main power switch device is turned off, and to be turned off at the time when the first main power switch device is turned on to generate the compensation current across the resonant branch in the opposite direction to the main power filter current to thereby accomplish the charging and discharging process of the resonant capacitors in the second dead time.

10. The control method for a soft switch circuit in a switch power supply according to claim 8, wherein said generating the compensation currents across the resonant branch in the opposite direction to the main power filter current comprises:

in the positive half cycle, that is, when the main power filter current is in the positive direction, controlling the backward auxiliary switch device of the existing ARCP soft switch circuit to be turned on after the time when the second main power switch device is turned off and before the time when the first main power switch device is turned on, and to be turned off after the time when the first main power switch device is turned on and before the time when the first main power switch device is turned off, and controlling the forward auxiliary switch device to be turned on at the time when the first main power switch device is turned off, and to be turned off before the time when the second main power switch device is turned on to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the forward auxiliary switch device of the existing ARCP soft switch circuit to be turned on after the time when the first main power switch device is turned off and before the time when the second main power switch device is turned on, and to be turned off after the time when the second main power switch device is turned on and before the time when the second main power switch device is turned off, and controlling the backward auxiliary switch device to be turned on at the time when the second main power switch device is turned off, and to be turned off before the time when the first main power switch device is turned on to generate the compensation current across the resonant branch in the opposite direction to the main power filter current to thereby accomplish the charging and discharging process of the resonant capacitors in the second dead time.

11. The control method for a soft switch circuit in a switch power supply according to claim 8, wherein said generating the compensation currents across the resonant branch in the opposite direction to the main power filter current comprises:

in the positive half cycle, that is, when the main power filter current is in the positive direction, controlling the backward auxiliary switch device of the existing ARCP soft switch circuit to be turned on after the time when the second main power switch device is turned off and before the time when the first main power switch device is turned on, and to be turned off after the time when the first main power switch device is turned on and before the time when the first main power switch device is turned off, and controlling the forward auxiliary switch device to be turned on after the time when the first main power switch device is turned off and before the time when the second main power switch device is turned on, and to be turned off after the time when the second main power switch device is turned on and before the time when the second main power switch device is turned off to generate the compensation current across the resonant branch in the opposite direction to the main power filter current to thereby accomplish the charging and discharging process of the resonant capacitors in the first dead time; and in the negative half cycle, that is, when the main power filter current is in the negative direction, controlling the forward auxiliary switch device of the existing ARCP soft switch circuit to be turned on after the time when the first main power switch device is turned off and before the time when the second main power switch device is turned on, and to be turned off after the time when the second main power switch device is turned on and before the time when the second main power switch device is turned off, and controlling the backward auxiliary switch device to be turned on after the time when the second main power switch device is turned off and before the time when the first main power switch device is turned on, and to be turned off after the time when the first main power switch device is turned on and before the time when the first main power switch device is turned off to generate the compensation current across the resonant branch in the opposite direction to the main power filter current to thereby accomplish the charging and discharging process of the resonant capacitors in the second dead time.

12. The control method for a soft switch circuit in a switch power supply according to claim 8, wherein said generating the compensation currents across the resonant branch in the opposite direction to the main power filter current comprises:
in the positive half cycle, that is, when the main power filter current is in the positive direction, controlling the backward auxiliary switch device of the existing ARCP soft switch circuit to be turned on after the time when the second main power switch device is turned off and before the time when the first main power switch device is turned on, and to be turned off after the time when the first main power switch device is turned on and before the time when the first main power switch device is turned off, and controlling the forward auxiliary switch device to be turned on after the time when the first main power switch device is turned off and before the time when the second main power switch device is turned on, and to be turned off at the time when the second main power switch device is turned on to generate the compensation current across the resonant branch in the opposite direction to the main power filter current to thereby accomplish the charging and discharging process of the resonant capacitors in the first dead time; and
in the negative half cycle, that is, when the main power filter current is in the negative direction, controlling the forward auxiliary switch device of the existing ARCP soft switch circuit to be turned on after the time when the first main power switch device is turned off and before the time when the second main power switch device is turned on, and to be turned off after the time when the second main power switch device is turned on and before the time when the second main power switch device is turned off, and controlling the backward auxiliary switch device to be turned on after the time when the second main power switch device is turned off and before the time when the first main power switch device is turned on, and to be turned off at the time when the first main power switch device is turned on to generate the compensation current across the resonant branch in the opposite direction to the main power filter current to thereby accomplish the charging and discharging process of the resonant capacitors in the second dead time.

13. The control method for a soft switch circuit in a switch power supply according to claim 8, wherein said generating the compensation currents across the resonant branch in the opposite direction to the main power filter current comprises:
in the positive half cycle, that is, when the main power filter current is in the positive direction, controlling the backward auxiliary switch device of the existing ARCP soft switch circuit to be turned on after the time when the second main power switch device is turned off and before the time when the first main power switch device is turned on, and to be turned off after the time when the first main power switch device is turned on and before the time when the first main power switch device is turned off, and controlling the forward auxiliary switch device to be turned on after the time when the first main power switch device is turned off, and to be turned off before the time when the second main power switch device is turned on to generate the compensation current across the resonant branch in the opposite direction to the main power filter current to thereby accomplish the charging and discharging process of the resonant capacitors in the first dead time; and
in the negative half cycle, that is, when the main power filter current is in the negative direction, controlling the forward auxiliary switch device of the existing ARCP soft switch circuit to be turned on after the time when the first main power switch device is turned off and before the time when the second main power switch device is turned on, and to be turned off after the time when the second main power switch device is turned on and before the time when the second main power switch device is turned off, and controlling the backward auxiliary switch device to be turned on after the time when the second main power switch device is turned off, and to be turned off before the time when the first main power switch device is turned on to generate the compensation current across the resonant branch in the opposite direction to the main power filter current to thereby accomplish the charging and discharging process of the resonant capacitors in the second dead time.

14. The control method for a soft switch circuit in a switch power supply according to claim 1, wherein at least one of the main power switch devices and the auxiliary switch devices is an IGBT, MOSFET, GTO or SCR.

15. The control method for a soft switch circuit in a switch power supply according to claim 2, wherein at least one of the main power switch devices and the auxiliary switch devices is an IGBT, MOSFET, GTO or SCR.

16. The control method for a soft switch circuit in a switch power supply according to claim 3, wherein at least one of the main power switch devices and the auxiliary switch devices is an IGBT, MOSFET, GTO or SCR.

17. The control method for a soft switch circuit in a switch power supply according to claim 4, wherein at least one of the main power switch devices and the auxiliary switch devices is an IGBT, MOSFET, GTO or SCR.

18. The control method for a soft switch circuit in a switch power supply according to claim 5, wherein at least one of the main power switch devices and the auxiliary switch devices is an IGBT, MOSFET, GTO or SCR.

19. The control method for a soft switch circuit in a switch power supply according to claim 6, wherein at least one of the main power switch devices and the auxiliary switch devices is an IGBT, MOSFET, GTO or SCR.

20. The control method for a soft switch circuit in a switch power supply according to claim 7, wherein at least one of the main power switch devices and the auxiliary switch devices is an IGBT, MOSFET, GTO or SCR.

21. The control method for a soft switch circuit in a switch power supply according to claim 8, wherein at least one of the main power switch devices and the auxiliary switch devices is an IGBT, MOSFET, GTO or SCR.

22. The control method for a soft switch circuit in a switch power supply according to claim 9, wherein at least one of the main power switch devices and the auxiliary switch devices is an IGBT, MOSFET, GTO or SCR.

23. The control method for a soft switch circuit in a switch power supply according to claim 10, wherein at least one of the main power switch devices and the auxiliary switch devices is an IGBT, MOSFET, GTO or SCR.

24. The control method for a soft switch circuit in a switch power supply according to claim 11, wherein at least one of the main power switch devices and the auxiliary switch devices is an IGBT, MOSFET, GTO or SCR.

25. The control method for a soft switch circuit in a switch power supply according to claim 12, wherein at least one of the main power switch devices and the auxiliary switch devices is an IGBT, MOSFET, GTO or SCR.

26. The control method for a soft switch circuit in a switch power supply according to claim 13, wherein at least one of the main power switch devices and the auxiliary switch devices is an IGBT, MOSFET, GTO or SCR.

* * * * *

UNITED STATES PATENT AND TRADEMARK OFFICE
CERTIFICATE OF CORRECTION

| | |
|---|---|
| PATENT NO. | : 8,416,592 B2 |
| APPLICATION NO. | : 12/678030 |
| DATED | : April 9, 2013 |
| INVENTOR(S) | : Zhang et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 377 days.

Signed and Sealed this
Third Day of February, 2015

Michelle K. Lee
*Deputy Director of the United States Patent and Trademark Office*